United States Patent [19]
Pasch et al.

[11] Patent Number: 5,273,563
[45] Date of Patent: Dec. 28, 1993

[54] FILTER MEDIA RETAINING ASSEMBLY FOR AN AIR FILTER

[75] Inventors: Roger M. Pasch, Windsor; Charles W. Hill; James R. Enright, both of Madison; Karen Zimmerman, Baraboo; Dale M. Evans, Windsor, all of Wis.

[73] Assignee: Research Products Corp., Madison, Wis.

[21] Appl. No.: 996,735

[22] Filed: Dec. 24, 1992

[51] Int. Cl.⁵ .............................................. B01D 46/52
[52] U.S. Cl. ................................... 55/493; 55/497; 55/503; 55/511; 55/521; 55/DIG. 31
[58] Field of Search ............... 55/491, 492, 493, 497, 55/501, 503, 511, 521, DIG. 31

[56] References Cited

U.S. PATENT DOCUMENTS

| | | | |
|---|---|---|---|
| 3,606,739 | 7/1969 | Peterson | 55/491 X |
| 3,778,985 | 12/1973 | Daigle et al. | 55/497 |
| 4,086,071 | 4/1978 | Champlin | 55/501 |
| 4,133,661 | 1/1979 | Strnad | 55/497 |
| 4,547,950 | 10/1985 | Thompson | 55/521 X |
| 5,133,789 | 7/1992 | Smith | 55/491 |

Primary Examiner—Charles Hart
Attorney, Agent, or Firm—Andrus, Sceales, Starke & Sawall

[57] ABSTRACT

A filter media retaining assembly for use in an air filter includes a filter media engaging flange disposed on the side wall of the filter framework which holds a pleat of the filter media adjacent the side wall and a hinged keeper disposed along the edge of the side wall and movable between a closed position in which a portion of the keeper engages the filter media and the flange so as to retain the filter media in position along the flange and an open position in which the filter media may be lifted and removed from the flange.

14 Claims, 3 Drawing Sheets

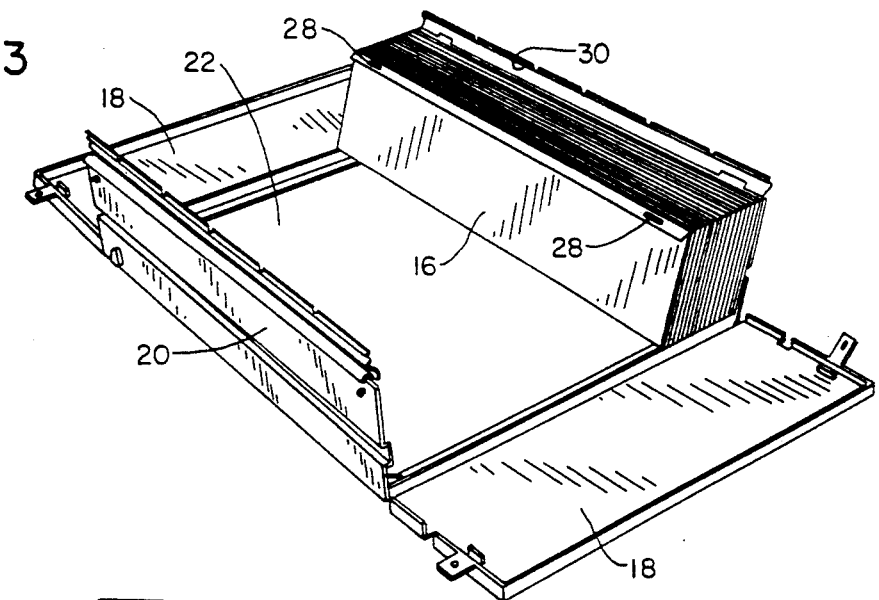
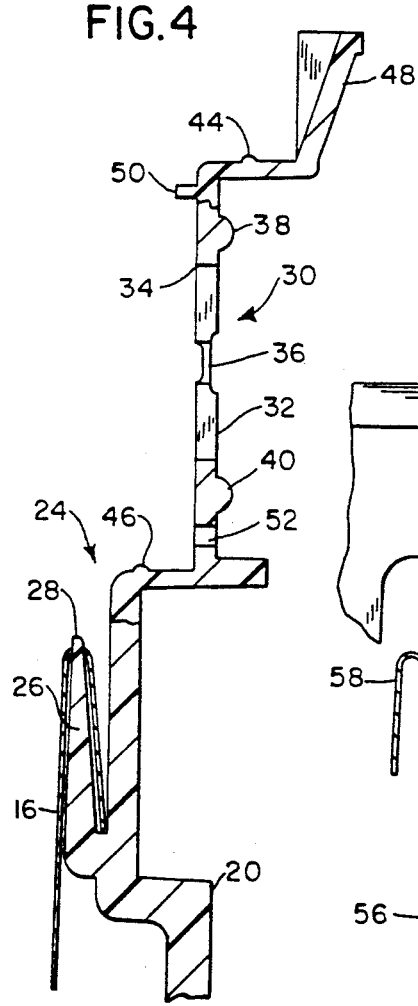
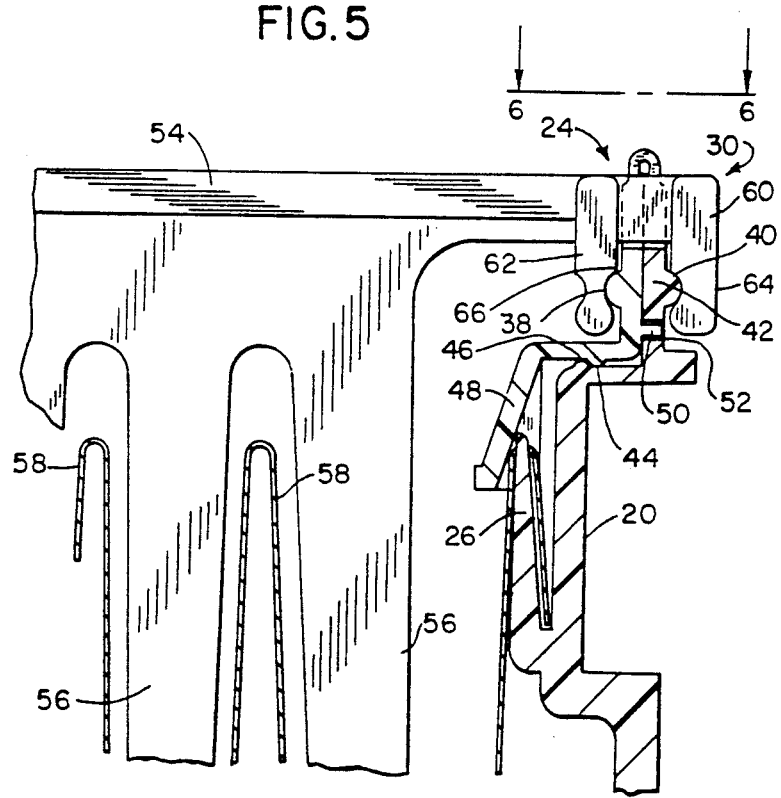

FILTER MEDIA RETAINING ASSEMBLY FOR AN AIR FILTER

BACKGROUND OF THE INVENTION

The present invention relates to air filters and more particularly to an assembly for retaining the filter media in the air filter.

Air filters for domestic use are typically used in conjunction with the heating and/or ventilating system of the structure. Typically, a framework holding the filter media is disposed in the air path of the ventilation system so that air is drawn across the filter media and unwanted particulate matter is filtered from the air stream. Routine maintenance of such an air filter requires the periodic replacement of the filter media.

In the past, the filter media was held in place in the air filter by mechanically fastening the filter media to holding brackets with a number of clips. Thus, replacement of the filter media required removal of the retaining clips and positioning of the filter media across the holding brackets. This replacement procedure was time consuming and cumbersome.

It is an object of the present invention to provide a filter media retaining assembly that facilitates the replacement of the filter media while insuring proper disposition of the filter media within the filter frame.

SUMMARY OF THE INVENTION

A filter media retaining assembly for an air filter includes a filter media engaging flange disposed on the side wall of the filter framework that holds a pleat of the filter media substantially adjacent the side wall.

In accordance with yet another aspect of the invention, the filter media is provided with an opening through which the flange may be inserted which facilitates the proper positioning of the filter media.

In accordance with one aspect of the invention, the filter media retaining assembly is provided with a hinged keeper disposed along an edge of the side wall of the filter frame and movable between a closed position in which a portion of the keeper engages the filter media and holds the filter media in position along the flange and an open position in which the filter media may be removed from the filter engaging flange.

In accordance with yet another aspect of the invention, the filter media retaining assembly is provided with a detent mechanism that holds the hinged keeper in place until it can be locked into position.

In accordance with still another aspect of the invention, the filter media retaining assembly is provided with a locking means disposed on the spacer bar that engages and holds the hinged keeper in its closed position.

The present invention thus provides a filter media retaining assembly that securely locks the filter media in position within the framework and also simplifies the positioning and fastening of the filter media within the framework.

The present invention also provides a filter media retaining assembly that provides a seal along the framework edge to minimize the amount of leakage around the filter media and thus enhance the filtering operation.

BRIEF DESCRIPTION OF THE DRAWINGS

The drawings illustrate the best mode presently contemplated of carrying out the invention.

In the drawings:

FIG. 3 is a perspective view of the air filter of FIG. 1 and showing the assembly of the framework and the installation of the filter media;

FIG. 4 is a side cross-sectional view of the filter media retaining assembly in an open position;

FIG. 5 is a side cross-sectional view of the air filter and filter media retaining assembly in a closed position.

DETAILED DESCRIPTION OF THE PREFERRED EMBODIMENT

Figure 1:
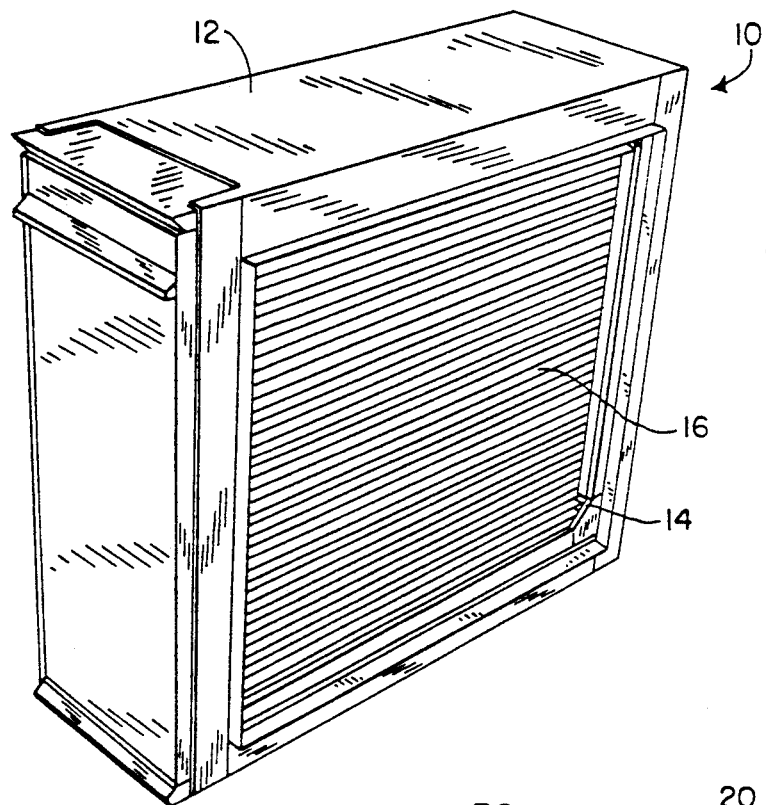
FIG. 1 is a perspective view of an air filter constructed according to the present invention.
Figure 2:
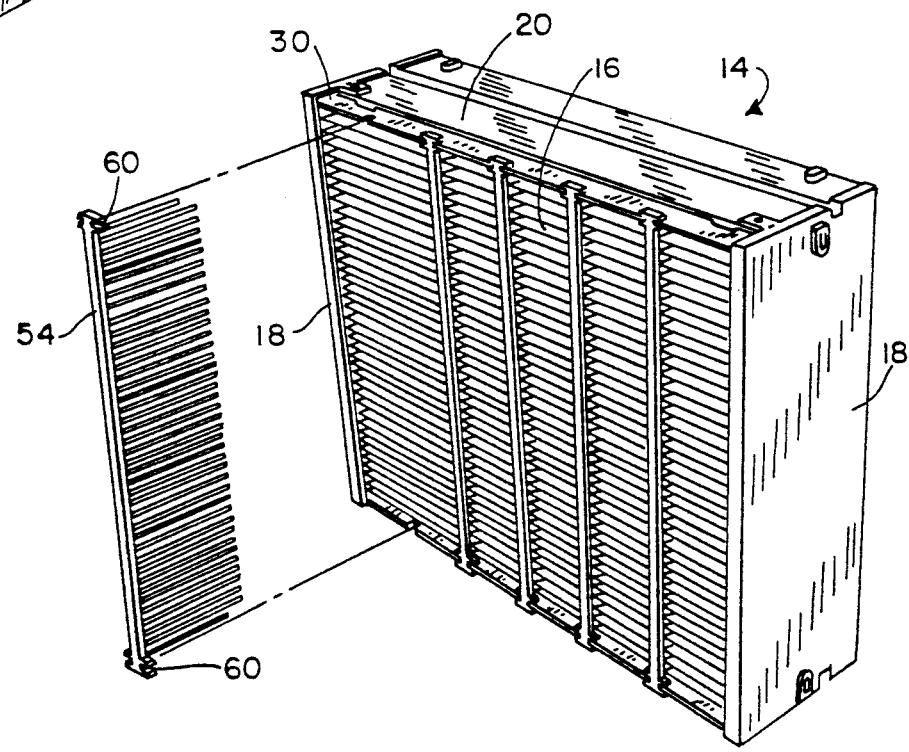
FIG. 2 is a perspective view of the air filter of FIG. 1 and showing the insertion and positioning of the spacer bars.
Figure 6:
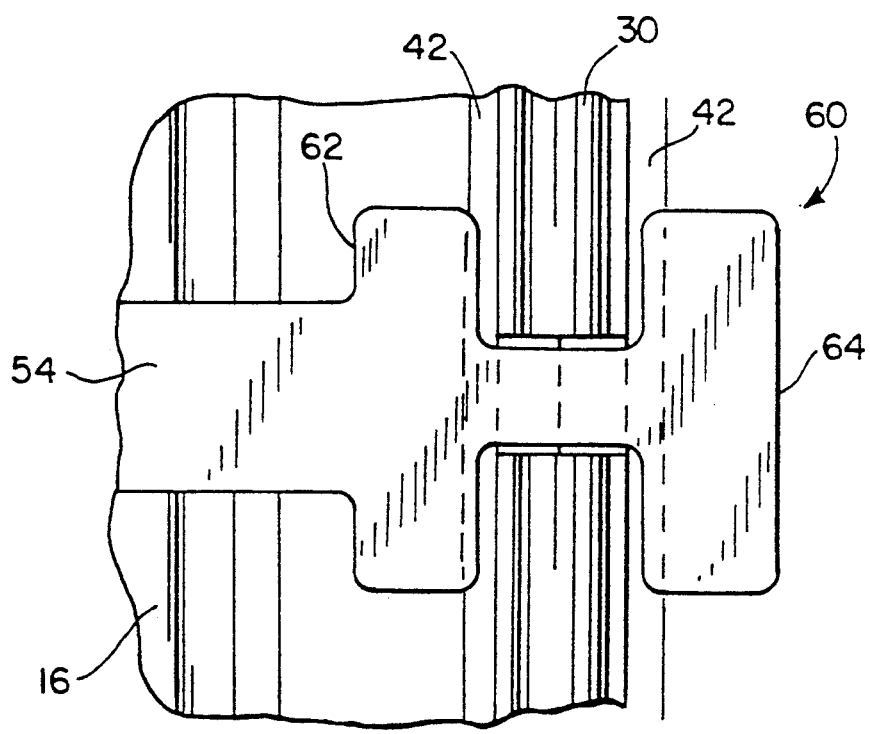
FIG. 6 is a sectional view along the line 6—6 of FIG. 5.

As shown in FIG. 1, an air filter 10 includes a housing 12 in which a filter framework 14 is slidably disposed. Filter framework 14 holds replaceable pleated filter media 16. In operation, housing 12 of air filter 10 is positioned in the ventilation system of a home or other structure and air is drawn across filter media 16 so as to remove undesirable particulate matter from the air. Periodic maintenance of air filter 10 requires replacement of filter media 16 and this is performed by sliding filter framework 14 out from housing 12 (FIG. 2).

Framework 14 in which filter media 16 is disposed includes a pair of opposed end walls 18 and a pair of opposed side walls 20 that define a rectangular opening 22. Filter media 16 is connected to side walls 20 and spans opening 22. In order to enhance the filtering process, it is desirable to have an effective seal between filter media 16 and end walls 20 so as to minimize the possible leak path around filter media 16. It is also desirable to provide a filter media retaining assembly that facilitates the positioning and installation of filter media 16. In this regard, side walls 20 of filter framework 14 are provided with a filter media retaining assembly 24.

Retaining assembly 24 includes a flange 26 disposed on the inner surface of side wall 20 and extending outwardly into opening 22. A portion of pleated filter media 16 is placed over flange 26. In order to facilitate the positioning of filter media 16 on flange 26, filter media 16 is provided with a pair of openings 28 through which flange 26 may be inserted.

Retaining assembly 24 is also provided with a hinged keeper 30 that is movable between an open position (FIG. 4) in which filter media 16 may be lifted off of flange 26 and a closed position (FIG. 5) in which filter media 16 is retained on flange 26.

As shown in FIGS. 4 and 5, hinged keeper 30 is provided with a lower portion 32 and an upper portion 34 separated by a live hinge 36. Also, both upper portion 34 and lower portion 32 are provided with bumps 38 and 40 respectively that define a rib 42 when hinged keeper 30 is moved to its closed position. Upper portion 34 is also provided with a projection 44 that engages a similar projection 46 on side wall 20 so that hinged keeper 30 may be temporarily held in its closed position.

Upper portion 34 is also provided with a lip 48 that extends into opening 22 and which engages filter media 16 and the edge of flange 26 when hinged keeper 30 is in its closed position. The abutment of lip 48 with filter media 16 and flange 26 acts to provide a seal between filter media 16 and side wall 20 so as to minimize the potential leak path around filter media 16.

Finally, upper portion 34 is provided with a pin 50 that is received by a hole 52 in lower portion 32 when hinged keeper is moved to its closed position. Pin 50 in hole 52 helps locate and position hinged keeper 30 when it is moved to its closed position and maintain contact between projections 44 and 46. As is customary with air filters of this type, air filter 10 is provided with a plurality of elongated pleat spacer bars 54 that span opening 22 and have a plurality of fingers 56 that extend between pleats 58 of filter media 16 so as to maintain proper spacing between pleats 58. As part of retaining assembly 24, pleat spacer 54 is provided with a resilient jaw 60 that engages and locks hinged keeper 30 in its closed position.

Resilient jaw 60 is comprised of a pair of resilient arms 62 and 64 that extend from spacer bar 54 and define a notched opening 66 that accepts and holds rib 42 on hinged keeper 30.

When during the course of use of air filter 10 it becomes necessary to replace filter media 16, a new filter media 16 is disposed and stretched across opening 22 and holes 28 in filter media 16 are placed over flange 26. Hinged keeper 30 is then moved from its open position (FIG. 4) to its closed position (FIG. 5). Hinged keeper 30 will be temporarily retained in this closed position by the interaction of projections 44 and 46 and pin 50 in hole 52.

Spacer bars 54 are then placed across opening 22 so that each of fingers 56 separates a pleat 58 of filter media 16. Resilient jaw 60 is then forced down over rib 42 so that rib 42 is forced into the notched opening 66. Hinged keeper 30 is thus locked into its closed position.

Thus, the present invention provides a filter media retaining assembly that provides an effective seal between the side walls of the filter framework and the filter media and also provides a simple and efficient means for replacing the filter media and securing it in place.

Various modes of carrying out the invention are contemplated as being within the scope of the following claims particularly pointing out and distinctly claiming the subject matter regarded as the invention.

I claim:

1. In an air cleaner of the type in which a pleated filter media is removably disposed in and spans an opening defined by a rigid framework having a pair of opposing side walls and a pair of opposing end walls, an improved filter media retaining assembly comprising:

filter media engaging means disposed on the side wall for holding a pleat of the filter media in draped relationship substantially adjacent the side wall, a hinged keeper disposed along an edge of the side wall and movable between a closed position in which a portion of said keeper engages the filter media and retains the filter media in position substantially around said filter media engaging means and an open position in which the filter media may be removed from said filter media engaging means.

2. The filter media retaining assembly defined in claim 1 further comprising detent means for holding said hinged keeper in said closed position.

3. The filter media retaining assembly defined in claim 2 further comprising positioning means for locating and maintaining the position of said detent means of said hinged keeper when in said closed position.

4. The filter media retaining assembly defined in claim 1 further comprising locking means for maintaining said hinged keeper in said closed position.

5. The filter media retaining assembly defined in claim 1 wherein said media engaging means comprises a flange on said side wall extending into the opening and over which a portion of the filter media may be disposed.

6. The filter media retaining assembly defined in claim 5 wherein said hinged keeper comprises a lip extending into the opening and engaging said flange and the filter media when said hinged keeper is in said closed position so that the filter media is maintained in position over said flange.

7. The filter media retaining assembly defined in claim 5 wherein said filter media is provided with an opening through which said flange is inserted.

8. The filter media retaining assembly defined in claim 4 wherein said locking means comprises an elongated spacer bar disposed across the opening and having a plurality of fingers disposed between the pleats of said filter media to maintain the spacing between the pleats with an end of said spacer bar comprising a resilient jaw that engages and locks said hinged keeper in said closed position.

9. The filter media retaining assembly defined in claim 8 wherein said resilient jaw comprises a pair of spaced apart resilient arms extending from said spacer bar and defining a notched opening that accepts and holds a rib disposed on said hinged keeper when said hinged keeper is in said closed position.

10. The filter media retaining assembly defined in claim 2 wherein said detent means comprises a projection on said hinged keeper that engages a projection on the end wall when said hinged keeper is in said closed position.

11. The filter media retaining assembly defined in claim 3 wherein said positioning means comprises a pin extending from one portion of said hinged keeper and a pin receiving hole disposed in another portion of said hinged keeper such that said pin is disposed in said hole when said hinged keeper is in said closed position.

12. In an air cleaner of the type in which a pleated filter media is removably disposed in and spans an opening defined by a rigid framework having a pair of opposing side walls and a pair of opposing end walls, an improved filter media retaining assembly comprising:

a flange on said side wall extending into the opening and substantially around which a portion of the filter media is enveloped.

13. The filter media retaining assembly defined in claim 12 wherein said filter media is provided with an opening through which said flange is inserted.

14. The filter media retaining assembly defined in claim 1, wherein said filter media is provided with a retainer opening through which said filter media engaging means projects.

* * * * *